MAGNETIC LOGIC DEVICE

Filed Feb. 9, 1959

2 Sheets-Sheet 1

INVENTOR.
DOUGLAS C. ENGELBART
BY Lyon & Lyon
ATTORNEYS

March 26, 1963 D. C. ENGELBART 3,083,355

MAGNETIC LOGIC DEVICE

Filed Feb. 9, 1959 2 Sheets-Sheet 2

INVENTOR.
DOUGLAS C. ENGELBART

BY Lyon & Lyon

ATTORNEYS

United States Patent Office 3,083,355
Patented Mar. 26, 1963

3,083,355

MAGNETIC LOGIC DEVICE

Douglas C. Engelbart, Palo Alto, Calif., assignor to Stanford Research Institute, Palo Alto, Calif., a corporation of California Filed Feb. 9, 1959, Ser. No. 791,995
7 Claims. (Cl. 340—174)

This invention relates to circuits employing magnetic cores and, more particularly, to improvements therein.

Toroidal magnetic cores of the type having substantially rectangular characteristics, or two states of stable remanence, have found extensive use in the information-handling field. The cores are interconnected to operate as memory devices, shift registers, or logical circuits. These cores are toroidal in shape and have a single hole in the center. It has recently been found that by placing additional holes in the toroid beside the center hole, the magnetic core exhibits some extremely useful properties. These will include nondestructive readout and can permit the construction of shift registers without the diodes. See Patent No. 2,818,556 to Arthur W. Lo for Magnetic System, issued December 31, 1957, and an article entitled, "A High-Speed Logic System Using Magnetic Elements and Connecting Wires Only," by Hewitt D. Crane, in the January 1959 issue of the IRE Proceedings, page 63.

One of the factors which has mitigated against the extensive use of multi-aperture magnetic cores is that their manufacture is quite difficult. The multi-aperture core material is usually a magnetic ferrite and not a metal wrap. The die employed for making the multi-aperture device out of the ferrite material is quite expensive. Furthermore, there is extensive wear on the die and core breakage during the process of manufacture.

An object of this invention is to provide a magnetic circuit which employs simple, single-path cores for obtaining results similar to those obtainable with multi-aperture or multi-path cores.

Another object of the present invention is the provision of a novel and useful circuit arrangement employing simple magnetic cores.

Yet another object of the present invention is to provide an arrangement of simple cores for simulating multi-aperture core arrangements.

These and other objects of the invention may be achieved in a circuit which, by way of example, can simulate a magnetic core having two apertures in the sides thereof besides the central aperture, by means of three cores. These three cores have two stable states of magnetic remanence and can be driven or switched from one to the other of these stable states. A second of these three cores, however, has a higher switching threshold than the others. An input winding is wound on a first of the three cores in one sense and thereafter on the second of the three cores with a relatively opposite sense. An output winding is wound on the second of the three cores in one sense and thereafter on the third of the three cores with a relatively opposite sense.

Initially, the cores are cleared to the same stable remanence condition. The application of a current to the input winding in the proper polarity and having an amplitude to exceed the switching threshold of the second core can cause both the second and the third cores to switch their stable remanence condition. Current applied with the proper polarity and an amplitude to exceed the switching threshold of the first core can cause the first core to be switched away from its initial state of stable remanence without causing the second core to be switched back to its initial state of stable remanence. To reset all the cores, a clear winding is wound on the three cores with the same relative sense. A clear current must have a sufficient amplitude to saturate all three cores strongly in the clear direction.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figures 1, 2:
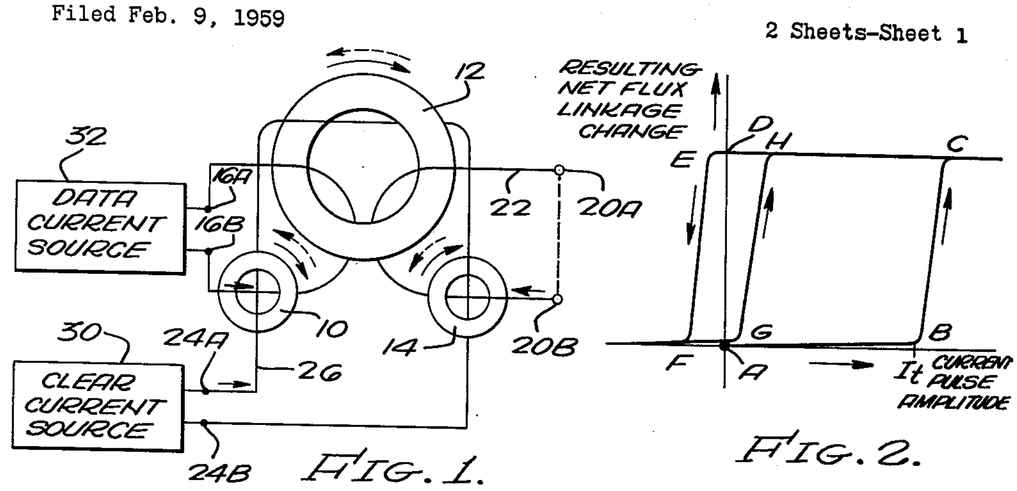
FIGURE 1 shows a circuit diagram at a basic magnetic array in accordance with this invention.
FIGURE 2 is a curve representing the input characteristics of the magnetic array shown in FIGURE 1.

Reference is now made to FIGURE 1 which shows a basic magnetic circuit array in accordance with this invention. This will include three cores, respectively designated as a first core 10, a second core 12, and a third core 14. These cores may be the commercially purchasable types of magnetic ferrite cores, but if desired, other suitable single-path magnetic elements may be employed as well. Therefore, the word core is not intended to mean only a toroid. It is also intended to cover other forms of magnetic elements having the properties required for functioning in the embodiment of the invention. These cores may have two states of stable magnetic remanence, with preferably a substantially rectangular hysteresis loop. Further, the cores must be capable of being switched from the one to the other of their two stable states of stable remanence. The second core 12 may also have a higher switching threshold than either of the cores 10 or 14. Such higher switching threshold may be obtained either by using a larger second core or by changing the turns ratios of windings common to both the second and either the third or first core, as will be subsequently described. In any event, when it is indicated herein that the second core has a higher switching threshold than either of the first or third core, it is intended thereby to include any arrangements which may be employed for obtaining such higher switching threshold.

A pair of input terminals 16A, 16B are connected to an input winding 18. The input winding is wound first upon the first core with one sense and then upon the second core with an opposite sense. In order to maintain simplicity in the drawings and explanation, the windings will be represented on the drawing as being coupled to the cores by a single turn. As is well known in the art, the number of turns used for switching a core depends upon the core material, the size of the core, or the amount of driving current available. Output terminals 20A, 20B have connected thereto an output winding 22, which is wound upon the second core 12 in one sense and thereafter upon the third core 14 in an opposite sense. A pair of clear terminals 24A, 24B have connected thereto a clear winding 26. This clear winding is wound upon all of the cores in the same sense.

Let it first be assumed that a current is provided from the clear current source 30, which flows in the direction of the arrow along the clear winding 26, and which has an amplitude sufficient to establish the three cores in the same state of remanence, which will be known as the clear state. The clear state is represented by the solid arrows going in the clockwise direction adjacent to the cores. Referring to FIGURE 2 of the drawings, there is shown the input characteristic or hysteresis curve for the cores as seen in terminals 16A and 16B. Data-current-source pulse height is the variable for the horizontal coordinate, and the net flux-linkage change seen at the terminals 16A and 16B due to each pulse-height value, for various initial conditions of the array, is the variable for the vertical coordinate. With all of the cores initially in the clockwise-saturated state, which is the cleared state for the array, the curve A, B, C represents the input characteristics as seen from the terminals 16A and 16B for positive currents in the direction shown by the arrow in FIGURE 1. Characteristics for negative input currents, from the cleared state of the array, are not pertinent at this time. After having driven an initially-cleared array beyond point C with a positive input current pulse, we say that the array is in the set state, and assume a residual state on FIGURE 2 at point D. Further positive input current pulses accomplish no switching. Negative pulses produce a characteristic corresponding to curve D, E, F, and we will return to residual state A as far as the flux-linkage history of the input windings is concerned. However, from this new state, called the reset state, positive input current pulses trace out the characteristic curve A, G, H, with residual at D. Alternate negative and positive pulses will continue to trace about the loop D, E, F, A, G, H, D, etc. from this point on.

To explain these characteristics in more detail, let us assume that source 30 has once again issued a clear current of sufficient magnitude to saturate all three cores of the array strongly in the clockwise direction. The arrow is now in the clear state, once again at point A of FIGURE 2, and let us assume that current is applied to the input winding 18 from the data-current source 32. The input current flows in a direction in the input windings as denoted by the arrow. The direction of this current is such as to drive the first core 10 further into saturation in the state of remanence in which it already is. However, with respect to the second core 12, in view of the reversed coupling sense of the winding 18 upon that core, the tendency of the drive current is to alter the flux in the core toward the point B on the curve shown in FIGURE 2. When the drive current exceeds the amount required for switching the core (indicated as $I_t$ on FIGURE 2) and passes the point C on this characteristic curve, then as current is removed from the input winding, there will be no further flux-linkage switching and the array settles to the residual point D, which is the state of remanence opposite the point A. At this time, the flux in core 12 will be in a counterclockwise direction, as represented by the dotted arrow in FIGURE 1. As a result of the core 12 being switched, a voltage is induced in the output winding 22. Connecting the terminals 20A and 20B together, as represented by the dotted line, will enable a current to flow through this output winding in response to this voltage in a direction down through the core 12 and up through core 14. This current will seek a countering voltage to that induced by the switching of core 12, and to get this it will exceed the amount required to switch core 14. The net flux-linkage change in the output windings must be zero after a given pulse from source 32 is over, and so, disregarding inductance and resistance effects in the output winding, we say that core 14 switched as much of its flux in a counterclockwise direction as did core 12. The states of the two cores are now as indicated by the dotted arrows shown in FIGURE 1. Core 10 remains undisturbed in its initial state of remanence, and its flux is assumed to be oriented in the clockwise direction. The curve A, B, C, showing the transition characteristic at terminals 16A and 16B in going from the cleared to the set state, can thus be seen to depend upon the individual switching characteristics of both cores 12 and 14.

After having gone from the cleared state at point A to the set state at point D, the data current source 32 can get back the flux linkages required to put the array in the set state by issuing a negative-current pulse. This current flows down through core 12, which tends to switch it back into its clockwise state, and flows up through core 10, which tries to switch it away from its present clockwise state. Since core 10 has a lower switching threshold than core 12, the curve D, E, F by which the flux-linkage condition seen from terminals 16A and 16B is returned to its original value, represents the switching of core 10 all by itself. Similarly, the curve A, G, H subsequently traced by positive currents from the data current source represents the reverse switching of core 10 all by itself. When all of the cores of an array are reversed from their cleared state, the array is said to be in its reset state.

When the array is in either the set or the reset state, it is considered to hold a binary one, or to be in the one state. In the cleared state, the array is considered to hold a binary zero, or to be in the zero state. If it is desired to determine which of these two binary states the array of FIGURE 1 is in, a current may be caused to flow in the output winding 22 in a direction to switch core 14 to its remanence state with the flux therein in a clockwise direction. In FIGURE 1, as shown by the arrow, this current will flow down through core 14 and up through core 12, which direction tends to switch core 14 clockwise and core 12 counterclockwise. If the amplitude of this current is greater than that required to switch core 14, but less than that which would switch core 12 and through it core 10, then the state of the array can be determined by the result of this current pulse. If the array had held a one, core 14 would switch and a voltage would be induced in the output winding 22, which could be detected. If the array had held a zero, no switching and no induced voltage would result. In neither case would cores 12 and 10 be affected by the interrogation or readout current.

It can be seen from the description of the characteristics of FIGURE 2, and from the symmetry of the array, that the above readout current must be in a range corresponding to that between points A and B.

The analogy to the multi-aperture core behavior should now become apparent. The multi-aperture core in its clear state cannot be switched to its one state by the application of current to one of the apertures in the arms of the core until such current exceeds a relatively high threshold value which is sufficient to switch flux around the main aperture of the core. With the array shown in FIGURE 1 and from the description previously given, it will become apparent that in order to set a cleared array into its one state it is necessary to provide a sufficient current to exceed the relatively high threshold presented to the input windings by the combined characteristics of the second and third cores. Once a multi-aperture core is set in its one state, readout can be derived from the output aperture by applying a current thereto whose value is less than the initial switching value. With the magnetic array provided by the invention, the current applied to the output winding to derive readout has an amplitude which is less than that required for setting the array to the one state. It should thus become apparent that the behavior of the array shown in FIGURE 1 is analogous to the behavior of a multi-aperture core having two apertures in the arms of the toroid adjacent the main aperture. It can also be stated that, in accordance with this invention, similar to multi-aperture cores having a plurality of small apertures besides the main aperture, a magnetic array may be provided having a plurality of cores coupled by windings to the main, or second, core.

Figure 3:
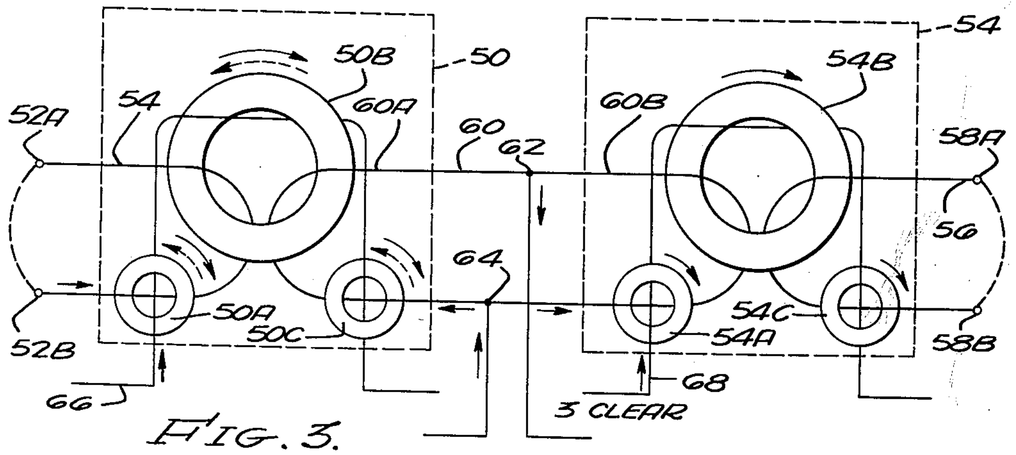
FIGURE 3 is a circuit diagram of two basic magnetic arrays shown for explaining a transfer operation.

Reference is now made to FIGURE 3, which is a circuit diagram showing two of the basic magnetic arrays which are shown for the purpose of explaining and illustrating the operation entailed in transferring data from one array to the other. The first array which is enclosed in the dotted rectangle bearing the reference numeral 50 has the three cores respectively designated as 50A, 50B, 50C. Two input terminals 52A, 52B have an input winding 54 connected thereto and coupled with one sense to the core 50A and in an opposite sense to the core 50B. The second array 54 also has three cores 54A, 54B, 54C. An output winding 56 is wound on core 54B with one sense and on core 54C with an opposite sense. Output terminals 58A and 58B are connected to the output winding. A transfer winding 60 is made up of two parts. The first part 60A can be considered as the output winding of the first synthetic array 50 and is wound upon core 50B with one sense and upon core 50C with an opposite sense. This output winding is connected to a pair of transfer terminals 62, 64. The second half 60B of the transfer winding 60 comprises the input winding to the magnetic array 54. The second half of the transfer winding 60B is wound upon core 54B with one sense and upon core 54A with an opposite sense. The second half of the transfer winding 60B is also connected to the terminals 62, 64 whereby the two halves 60A, 60B can be considered as a single transfer winding 60.

Assume at the outset that a first clear winding 66, which is wound on cores 50A, 50B, and 50C with the same sense has had a current applied thereto which exceeds the current required for switching the three cores and which drives them to their clear state. Assume, further, that the second clear winding 68, which is wound upon the cores 54A, 54B, 54C with the same sense has been excited with the current having a sufficient amplitude to set the three cores in their clear state. At this time, the flux in the cores in both magnetic arrays will be in a direction shown by the solid arrows.

Assume that at this time a transfer current is applied to the terminals 62, 64, which has a value twice the threshold current. The current $2I_t$ is applied to the terminals 62, 64 to flow in the direction shown by the arrow entering terminal 64 and leaving terminal 62. This current will split in half and flow through the two halves of the transfer winding in opposite directions from the terminal 64. The current flowing through the winding passing through core 50C is in a direction to drive that core further into the state of remanence in which it already is. The current thereafter will flow up through core 50B, but will not affect the state of that core in view of the fact that its value is at the switching threshold but not over it, and therefore core 50B will be left in its cleared state of remanence. The current flows through core 54A in a direction to drive it further into the state of saturation in which it already is, and thus that core will not have its remanence condition altered by this current. Core 54B is not affected by the current flowing in the half of the transfer winding 60B, in view of the fact that this current is at the switching threshold but not beyond it and therefore core 54B will not be switched, but will remain in its initial state of remanence. Since neither core 50B nor core 54B is altered by the application of the transfer current when both the synthetic magnetic arrays are in their zero condition, there is no further propagation from the synthetic arrays, either into winding 54 or into winding 56.

Assume now that both synthetic magnetic arrays 50, 54 are in their cleared state. A one is entered into the synthetic magnetic array 50 by exciting the input winding 54 with a current which exceeds the value of $I_t$, and thus results in switching the cores 50B and 50C so that they have their flux circulating in a counterclockwise direction, as represented by the dotted arrows. The synthetic magnetic array 50 now is in its set, or one, state. At the time that the core 50B is switched, it induces a voltage in the transfer winding which will cause a current to circulate up through core 50C, whereby core 50C is switched with its flux in a counterclockwise direction. The current will then continue down through core 54A, but has no effect on this core, since the current tends to drive it further in its direction of saturation. The current will then circulate up through core 54B. This, however, will not affect core 54B, since its switching threshold exceeds the switching threshold of core 50C, as a result of which core 50C switches first and thereby accepts all the flux linkages, or volt-seconds from 50B. It should therefore be apparent that when the first magnetic array is driven into its one state, there is no propagation or resultant effect of this upon the subsequent magnetic array to which it is coupled.

Assume now that a current is applied to the transfer terminals 62, 64, equal to twice the threshold value, $I_t$. As described previously, this current divides into two equal parts. The current that flows through core 50C, which is now in its counterclockwise state of remanence causes core 50C to be switched back to its clockwise state. The direction of current flow in the transfer winding is such as to drive core 50B further into its counterclockwise state of remanence. The switching of core 50C induces a voltage in the transfer coil 60 which operates to cause more of the transfer current to flow in the half of the transfer coil 60B than flows in the half of the transfer coil 60A. The induced voltage opposes further current flow from terminal 64 through core 50C and 50B to terminal 62. Thus, the additional current which now flows through the half of the transfer coil 60B exceeds the amount required for switching core 54B, and through it core 54C. However, the direction of this current is such as not to affect the remanence state of core 54A. No further propagation would result from the output coil 56 if it were coupled to a succeeding magnetic array for the reasons previously stated when the magnetic array 50 was driven to its set state. From the description given, it should be apparent that the set or one state of the magnetic array 50 has been transferred to the magnetic array 54.

After the transfer current has been applied and the binary information stored in the first magnetic array 50 has been transferred into the second magnetic array 54 it is necessary to clear the first magnetic array so that it may be in condition to receive new information. This is done by applying a current to its clear winding 66 having a value sufficient to switch all three cores to which it is coupled. On winding 60A, core 50C is already in the state of remanence toward which it is being driven by the clear current, and the only core that will be switched on this winding is core 50B. As a result there is induced a voltage in the transfer coil in response to which a current flows up through the core 50B, down through the core 54B, up through the core 54A, and down through the core 50C. The direction of this current is such as to drive core 50C in the same direction as its clear state. The direction of this current through core 54A is such as to tend to switch it to the counterclockwise state. Therefore, although the direction of this current is such as to tend to switch core 54B from its set to its clear state, since the switching level of core 54A is below that of core 54B it will switch first and thus remove enough volt seconds of switching flux-linkage so that core 54B is not switched. It is thus seen that the clearing of the first magnetic array 50 does not destroy any of the information stored in the second magnetic array 54, but merely changes it from the set to the reset state. It is also seen that the clearing of the one state from array 50 caused no disturbance in the winding 56 of the succeeding array, and thus caused no disturbance to be propagated beyond array 54.

If array 50 were considered to have been set originally by means of a transfer operation from another similar array, attached to terminals 52A and 52B, and if we assume that this input array had been cleared itself sometime prior to the time when it is desired to clear array 50, then by the same reasoning as above it is seen that core 50A will be found to be in the counterclockwise state when the one is to be cleared from array 50. This follows in the same manner as it was explained for the switching of core 54A into the counterclockwise state when the one is cleared out of the array that initially set array 54, that is, when array 50 was cleared. Now, when clear current in winding 66 drives all of the cores in array 50 strongly into the clockwise state, it is seen that both cores 50A and 50B will be switched from the counterclockwise state. Since winding 54 is coupled with relatively opposite polarity to these two cores, this switching of cores 50A and 50B will produce no net flux-linkage change in this winding, and so no disturbance of the information state of the preceding array will be caused by the clearing of the one out of array 50.

Figure 4:
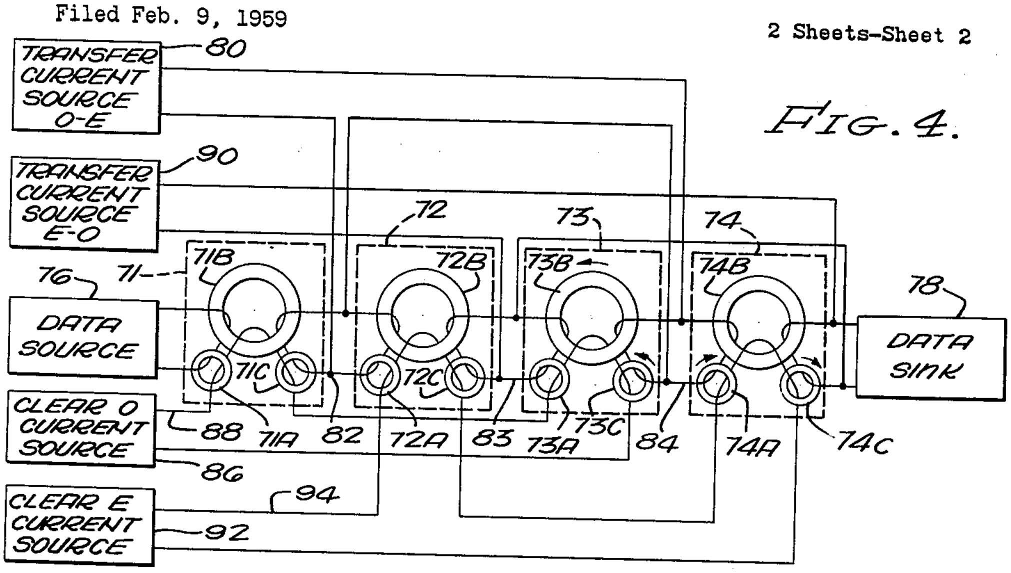
FIGURE 4 shows a circuit diagram of a shift register in accordance with this invention.

Reference is now made to FIGURE 4 which is a circuit diagram of a shift register in accordance with this invention. The shift register employs, by way of example, four magnetic arrays respectively 71, 72, 73, 74. Each of these magnetic arrays is substantially identical with the one shown in FIGURE 1 or, expressed another way, each two of the coupled magnetic arrays are substantially identical with the coupled magnetic arrays 50, 54 shown in FIGURE 3. Thus, an explanation of the transfer of data between, for example, the magnetic array 71 to the magnetic array 72, from 72 to 73 or from 73 to 74 is substantially identical with the explanation of the transfer of information previously given for FIGURE 3. Therefore, the explanation will not be repeated at this time except that the manner of the progression of the information will be described.

Essentially, a four phase clock sequence is required for shifting data along an arbitrarily long register section such as shown in FIGURE 4. A first binary bit of information is entered from the data source 76 into the first magnetic array 71. Thereafter, current is applied from a "transfer O–E" (odd-even) current source 80 to the transfer coils 82, 84 which couple the odd stages of the register to the even stages of the register. This current has a value of twice the switching threshold value, $I_t$ of FIGURE 2, which is the current above which will begin to set an array to the one state when applied to an input winding. As shown, the current is applied in series to all the transfer coils which couple the odd to the even stages. The result is the transfer of the data bit, which has been entered into the first magnetic array 71, into the second magnetic array 72. The second step in the operation of the shift register is to actuate the clear-odd-current source 86. This current source applies current to a clear winding 88 which is coupled to all the cores in the odd number arrays 71, 73. Clear-odd-current source 86 thus restores the odd stages to their cleared state. As was previously described, the operation of clearing the odd stages of the register has no effect upon the information in the even stages of the register.

Another binary bit of data can now be entered from the data source 76 into the input stage 71. Thereafter, the transfer even-odd-current source 90 is actuated to apply a current to the transfer coils 83 coupling the even to odd stages. This current is twice the threshold value $I_t$. The operation of this transfer current is to cause a shift of information from the second stage 72 of the shift register to the third stage 73 of the shift register. Thereafter, a clear-even-current source 92 is actuated to apply current to a second clear coil 94 which is coupled to all the cores in the even stages in the shift register. These include stage 72 and stage 74. Stage 72 is thereby cleared to receive the new information from stage 71. The information in stage 72 has already been transferred to stage 73. Thus the transfer odd-even current source 80 is again energized whereby the information in stage 71 is transferred to stage 72 and the information in stage 73 is transferred to stage 74.

Subsequently, the clear-odd-current source 86 is actuated to clear stages 71 and 73. New information can then be received from the data source 76 or, if desired, the information already in the register can be advanced into the data sink by successively exciting the transfer current sources and clear current sources in the order already described. After data are entered from the data source 76 into the register, if it is desired to circulate the contents of the register, all that is required is for the coil connecting the core 74B to the data sink 78 to be connected instead to the coil connecting the data source to the first synthetic magnetic array 71. Thereafter, the actuation in sequence of the transfer odd-even-current source, clear-odd-current source, transfer even-odd-current source and clear-even-current source will circulate the information entered into the register.

Figure 5:
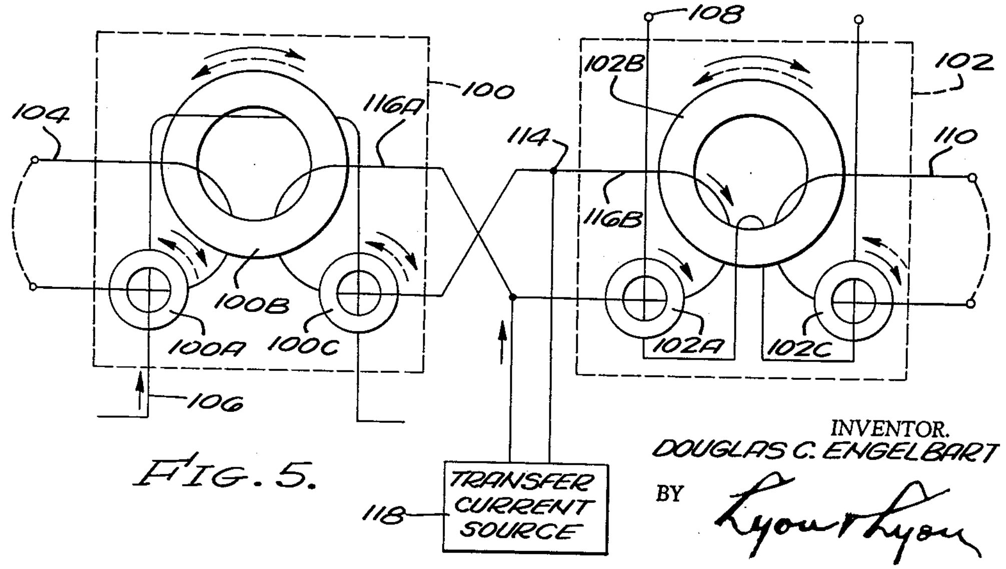
FIGURE 5 is a circuit diagram of two basic magnetic arrays arranged for an inverting or complementing transfer.

FIGURE 5 is a circuit diagram of a pair of synthetic magnetic arrays which are arranged for an inverting or complementing type of transfer. Each one of these arrays 100, 102 respectively contains three cores 100A, 100B, 100C and 102A, 102B, 102C. An input winding 104 is wound on cores 100A and 100B with a relatively opposite polarity. A first clear winding 106 is coupled to all the cores in the first synthetic magnetic array, and a second clear winding 108 is coupled to all the cores in the second magnetic array. An output winding 110 is wound on cores 102B and 102C with a relatively opposite sense in similar fashion as was previously described. A pair of transfer terminals 112, 114 are provided and the transfer winding 116 is connected to the transfer terminals whereby current can be applied from transfer current source 118 to these terminals and then to the transfer winding.

It will be noted that half of the transfer winding 116A is wound on cores 100B and 100C with a relatively opposite sense and the other half of the transfer winding 116B is wound on cores 102A and 102B with a relatively opposite sense. The connection of the winding half 116A to the terminals 112, 114 is reversed to the arrangement shown in FIGURE 3, for example. Such reversal enables an inverting or complementing transfer of data from stage 100 to stage 102.

Assume that arrays 100 and 102 are in their clear states as a result of clear currents being applied to windings 106 and 108. Therefore, the cores 100A, 100B, 100C, 102A, 102B, and 102C have their flux lines saturated in a clockwise direction. Assume at that time that the transfer current source 118 is actuated to apply a transfer current having the value $2I_t$, or twice the threshold current value, to the transfer winding 116. The current will divide. One half of the current will tend to flow through the transfer winding 116A down through the core 100B in a direction to drive this core further into its saturated state. The current will also flow up through core 100C in a direction to tend to switch this core to its counterclockwise state of magnetic remanence. Since the amplitude of the current exceeds the switching threshold of the core 100C, this core is switched. As a result of such switching operation, current steering occurs whereby more than half of the current coming from the transfer current source 118 is caused to flow in the half of the transfer winding 116B. The direction of this increased current flow is down through core 102A, which tends to drive it further into the state of saturation which it already has.

The current then continues up through core 102B in a direction to cause core 102B to be switched. The reason core 102B will switch is because the amount of current which is steered through the winding half 116B causes the total current through 102B to exceed the threshold or switching current value $I_t$. When core 102B switches to its opposite state of magnetic remanence, a voltage is induced in the coil 110 which, if its ends are connected together, provides a current of a sufficient amplitude and with the proper polarity to switch core 102C to its state of remanence whereby the flux lines circulate in a counterclockwise direction. It can therefore be seen that the application of a transfer current to the transfer winding when the first stage 100 is in its zero state effectuates a complementing operation whereby the second stage 102 is left in its one state.

Assume now that, beginning from the cleared state for array 100, input winding 104 has been excited with a current exceeding the threshold value whereby array 100 is put into the set state. Assume, further, that the second magnetic array 102 is in its clear state. Current induced in the transfer winding 116 when the core 100B is driven to its set state of magnetic remanence induces a current in the transfer winding 116. This current has a direction through core 100C to drive it away from its cleared remanent state. This current also flows through core 102B in a direction to drive it further into the state of remanence which it already occupies. The current continues up through core 102A in a direction to switch core 102A to the state of magnetic remanence opposite to the one which it occupies when in its cleared state. The flux liinkage switched into the transfer loop 116 from core 100B can therefore divide between cores 100C and 102A, since each of these can have the same threshold. If desired, transfer current can be caused to flow through an additional winding (not shown) down through core 102A during the transfer into array 100 in order to prevent any of the flux linkages being switched into core 102A. However, it will be seen that the effect of flux being switched into either core 100C or core 102A upon subsequent transfer operation between arrays 100 and 102 is essentially the same, and so there is, in the first-order analysis, nothing to be lost by allowing the flux linkages that are forced into this transfer loop when array 100 is set to go into cores 100C and 102A in any proportion whatsoever. That proportion of flux linkage which goes into core 100C subtracts from that which will be forced into the transfer loop when the transfer current drives this core all the way into counterclockwise saturation. That proportion of the flux linkage forced into this transfer loop when array 100 is set, and which goes into core 102A, will be forced back into this transfer loop by the action of the subsequent transfer current, in effect subtracting from the flux linkages being driven into the loop from core 100C by the transfer current, and so will serve the same purpose as far as the transfer operation is concerned as if it had been only switched into core 100C in the first place.

The transfer current source 118 now applies a current $2I_t$ to the transfer terminals 114, 116. The portion that flows through transfer winding half 116A flows down through core 100B in a direction which tends to switch the core, and up through core 100C in a direction to drive this core further into its set state of magnetic remanence. The current that flows through core 102A is in a direction to drive it into its clear state of magnetic remanence. It then flows up through core 102B in a direction to switch it away from its clear state of magnetic remanence. The amount of flux linkage now switched into the transfer loop from core 100C, and not cancelled by that switched from core 102A as described above, will essentially be equal to the difference between the switching capacity of core 100C and the amount of flux set into this loop through core 100B when array 100 was set into the one state. If a full one set of array 100 occurred, then the flux forced into the transfer loop at that time was substantially enough to cancel all of the flux linkages which core 100C would otherwise force into the transfer loop at transfer time. Under these conditions, then, essentially no net flux linkage will be switched into the loop during transfer time from cores 100C and 102A, and we have seen previously that the current will then divide evenly between the two halves of the transfer winding, and that array 102 will be left in the cleared state. Thus, the complement or negation of the information in array 100 has been transferred into array 102.

After the transfer operation from array 100 to array 102 is completed, the subsequent clearing of array 100 can be shown to produce no effect upon adjacent arrays that are particularly different from those produced by clearing a so-called positive array. A difference, of course, will appear in that the array 102 will be reset by the clearing of array 100 when array 100 had originally been in the zero state, and will transfer no net flux linkage to array 102 at clear time if it had been in the one state. In the latter case, both cores 100B and 100C will switch when array 100 is cleared, and their flux-linkage contributions to the transfer winding 116 will cancel each other.

From the above description it should be apparent how two stages with what may be termed a negation transfer winding coupling may be inserted into a shift register such as the one shown in FIGURE 4 or, simpler still, the negation type of operation may be obtained by connecting the transfer winding to the transfer terminals in the manner shown in FIGURE 5. Thus, a shift register may be provided which has a complementing type of operation as far as the information applied to its input and received from its output in concerned. It should be further noted that the circuit shown in FIGURE 5 can also serve as a logical element where the operation of complementing is required.

Figure 6:
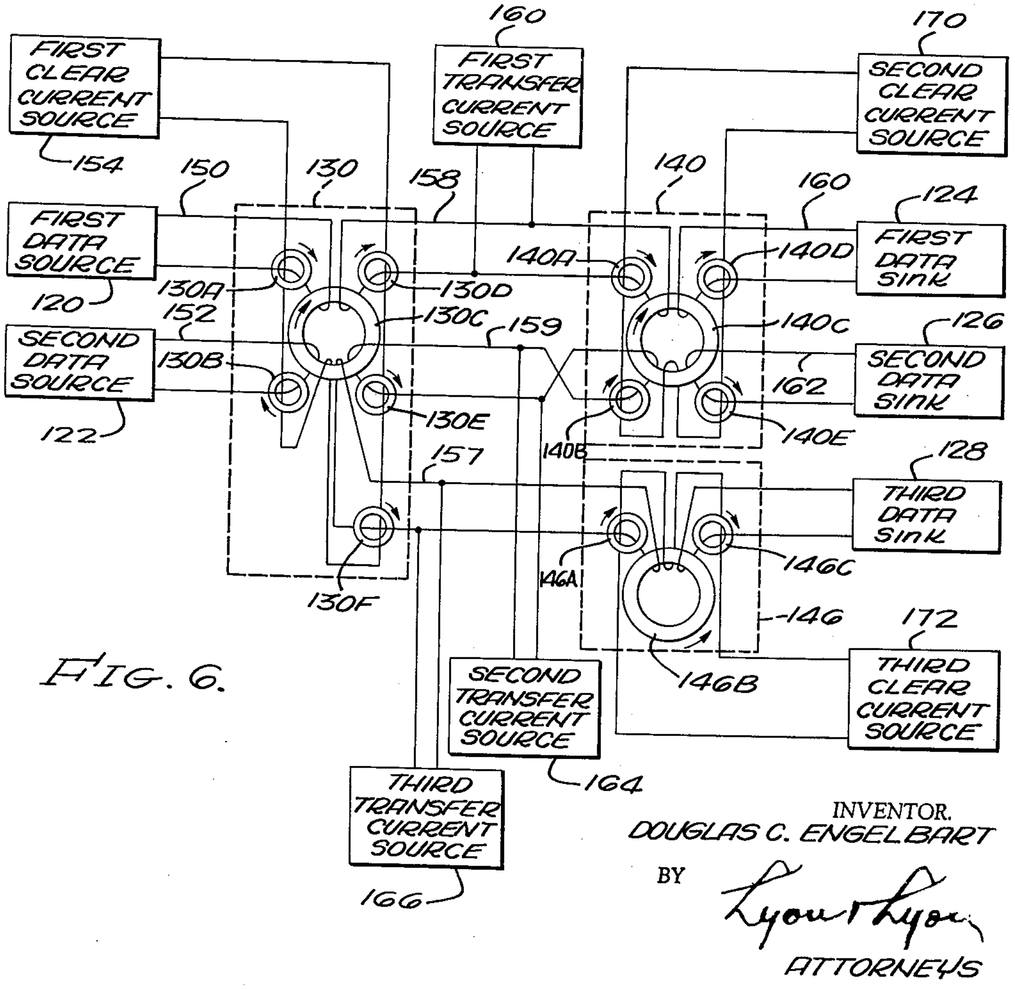
FIGURE 6 is a circuit diagram showing the basic magnetic array having a plurality of inputs and providing a plurality of outputs.

Reference is now made to FIGURE 6, which is a circuit diagram showing the basic magnetic arrays with a plurality of inputs and providing a plurality of outputs. By way of example, two inputs are provided from a first data source 120 and a second data source 122. Three outputs are derived respectively by a first data sink 124, a second data sink 126, and a third data sink 128. A first magnetic array 130 consists of a central core 130C having a higher threshold than the other cores, two input cores 130A and 130B, and three output cores 130D, 130E, and 130F. A second magnetic array 140 consists of a central core 140C having a higher threshold than the other cores of the array, two input cores 140A and 140B, and two output cores 140D and 140E. A third magnetic array 146 consists of a central core 146B having a larger threshold than the other two cores of the array, one input core 146A, and one output core 146C.

The first data source 120 and the second data source 122 can apply a binary bit of information to the magnetic array 130 by applying a current having a value in excess of the setting threshold of the array to the associated one of the respective input windings 150, 152. If the input information is a zero and if the convention for representing a zero is in the absence of current, then the cores will remain in their clear state as represented by the clockwise arrows shown on the drawing. If the convention for a zero is a current whose polarity is opposite to that of the polarity of the current representing a one, then the central core as well as the output cores will remain in their cleared condition, but the input cores 130A or 130B, depending upon which one of the data sources is providing the input, will be driven to their counterclockwise condition. This has no effect upon the output operation of the device, and since after each data bit has been entered the first clear-current source 154 is operated to clear all the cores, the system operation is not affected thereby.

Assume that information has been entered into array 130, with a first transfer coil 158 coupled between cores 134 and 132A to cores 136A and 140 in the manner previously explained for a positive transfer. Therefore, the first transfer current source 160 can transfer either a zero or a one, corresponding to the information entered into magnetic array 130 into the magnetic array 140, which results, when a one is transferred, in switching cores 140B, 140C, 140D, and 140E. The output winding 160 couples the first data sink 124 to array 140 and includes means for deriving the information transferred into this array when required. It should be noted that when a one is transferred, when the first transfer current source 160 provides the transfer current, core 140C will be switched and core 140D is switched. In addition, cores 140B and 140E are switched, since the voltage induced in the windings 159 and 162, when the core 140C is driven, will provide enough current for this purpose. Therefore, output can be separately derived by either the first or the second data sink or by both. In view of the fact that readout is performed with a current in the output windings which is lower than the setting threshold for array 140, it is seen that readout from one of the cores 140D will not affect the state of the other core 140E.

A readout from this magnetic array can be obtained by exciting any one of the three transfer coils 158, 159 and 157. Transfer windings 157 and 158 are wound on the associated cores in a manner to provide a positive or identical information transfer. Transfer winding 159 is reversed from the other transfer windings in a manner to provide the complementing or negation transfer. Transfer winding 159 is excited from the second transfer current source 164 and transfer winding 157 is excited from the third transfer current source 166.

If the magnetic array 130 has had a zero entered thereinto, excitation of the first transfer current source will transfer a zero into the magnetic array 140. Excitation of the third transfer current source will transfer a zero into the magnetic array 146. Excitation of the second transfer current source instead of the first transfer current source will result in the switching of cores 140C, 140A, 140D, and 140E in the couterclockwise direction, whereby the first and second data sinks can derive a one readout.

Assuming that the information in the magnetic array 130 is to be a one, then cores 130C, 130D, 130E, 130F and either 130B or 130 are all set when the input information is transferred from either the first or second data source respectively. This one can be transferred, by excitation of the first or third transfer current sources, to either array 140 or array 146. If the second transfer current source is excited instead of the first transfer current source, then array 140 will receive the negation of the contents of array 130, or zero. After each information entry and information transfer, the first clear current source, a second clear current source 170, and a third clear current source 172 are excited in sequence for the purpose of restoring all the cores to their clear conditions. It should be understood that any one of the first, second, or third data sinks can also be more magnetic arrays to form shift registers or delay lines.

There has accordingly been described and shown hereinabove a novel and useful magnetic array which provides facility for transferring and logically manipulating binary information.

I claim:

1. A magnetic array comprising first, second, and third magnetic cores each having two states of stable magnetic remanence and being capable of being switched between said two states, said second core having a higher switching threshold than said first and third cores, an input winding wound on said first core with one sense and on said second core with a relatively opposite sense, an output winding wound on said second core with one sense and on said third core with a relatively opposite sense, and a clear winding inductively coupled to said first, second, and third magnetic cores for driving them to a predetermined one of their states of stable magnetic remanence.

2. A magnetic array comprising six magnetic cores each having two states of stable magnetic remanence and being capable of being switched between said two states, a second and fifth of said six magnetic cores having a higher switching threshold than the remainder of said cores, an input winding wound on a first of said six magnetic cores with one sense and on said second magnetic core with a relatively opposite sense, a transfer winding having two halves, a first half of said transfer winding being wound on said second magnetic core with one sense and on a third of said six magnetic cores with a relatively opposite sense, a second half of said transfer winding being wound on a fourth of said six magnetic cores with one sense and on said fifth magnetic cores with a relatively opposite sense, a pair of terminals for applying transfer current to said transfer winding, means connecting said two halves of said transfer winding to said pair of terminals, and an output winding wound on said fifth core with one sense and on the sixth of said six magnetic cores with an opposite sense.

3. A storage circuit as recited in claim 2 wherein the sense of the winding of said first half of said transfer winding respectively on said second and third cores is reversed relative to the sense of the winding of said second half of said transfer winding respectively on said fifth and fourth cores.

4. A shift register comprising a plurality of storage circuits coupled in sequence each of said storage circuits having a first, second, and third magnetic core, each of said magnetic cores having two states of stable magnetic remanence and being capable of being switched from one to the other state, said second core having a higher switching threshold than said first and third core, an input winding wound on said first core with one sense and on said second core with an opposite sense, an output winding wound on said second core with one sense and on said third core with an opposite sense, a plurality of pairs of terminals for applying shift signals to said register, means connecting the input winding of each storage circuit and the output winding of the immediately preceding storage circuit in said sequence to a different pair of said pairs of terminals for forming said connected input and output windings into transfer windings, a first clear winding in one sense on all the cores in every other one of said storage circuits, and a second clear winding wound in said one sense on all the cores in the remaining ones of said storage circuits.

5. A shift register as recited in claim 4 wherein for each of selected ones of said storage circuits the sense of the winding of their output windings respectively on the second and third cores of said storage circuits is reversed relative to the sense of the coupling of an input winding on the respective second and first cores of a succeeding storage circuit, said input winding being the one connected to terminals with said output winding to form a transfer winding.

6. A magnetic logic element comprising a plurality of first magnetic cores, a second magnetic core and a plurality of third magnetic cores each of said cores having two states of stable magnetic remanence and being capable of being switched between said two states, said second magnetic core having a higher switching threshold than said plurality of first and third cores, a plurality of input windings a different one of which is associated with a different one of said plurality of first cores, each of said input windings being wound in one sense on the associated first core and in an opposite sense on said second core, a plurality of output windings, a different one of which is associated with a different one of said third cores, each of said output windings being wound in one sense on said second core and in an opposite sense on its associated third core, and a clear winding wound in the same sense on all said first, second, and third cores.

7. A magnetic shift register comprising a plurality of successively coupled stages each of which includes first, second, and third magnetic cores, each of which has two states of magnetic remanence and is capable of being driven from one to the other, an input winding for the first of said successively coupled stages said input winding being wound successively on the first core of said first stage in one sense and on the second core of said first stage with an opposite sense, an output winding for the last of said successively coupled stages, said output winding being wound successively on the second core of said last stage in one sense and on the third core of said last stage in an opposite sense, a plurality of transfer windings for coupling the stages of said shift register, each transfer winding being successively wound on a second core of one stage in one sense, on a third core of said one stage in an opposite sense, on a first core of the stage succeeding said one stage with a sense opposite to that of said transfer winding on said third core, and on the second core of the stage succeeding said one stage with a sense opposite to that on said first core, first means for applying a transfer current to alternately occurring transfer windings coupled to the sections of said transfer windings which extend between second cores and which extend between first and third cores, second means for applying a transfer current to the remaining transfer windings coupled to the sections of said remaining transfer windings which extend between second cores and which extend between first and third cores, a first clear winding wound in one sense to all the cores in alternate stages, and a second clear winding wound in one sense to all the cores in the remaining stages.

References Cited in the file of this patent

UNITED STATES PATENTS

| | | |
|---|---|---|
| 2,781,503 | Saunders | Feb. 12, 1957 |
| 2,872,667 | Chen | Feb. 3, 1959 |
| 2,925,958 | Polzin | Feb. 23, 1960 |
| 2,935,739 | Crane | May 3, 1960 |